July 12, 1938.　　A. R. WALLIS ET AL　　2,123,263
WIRE TYING APPARATUS FOR BALING, PACKING, AND THE LIKE
Filed Sept. 24, 1936　　3 Sheets-Sheet 1

Inventors
Arthur Richard Wallis
John James Cheesman
by Arthur W. Nelson Atty.

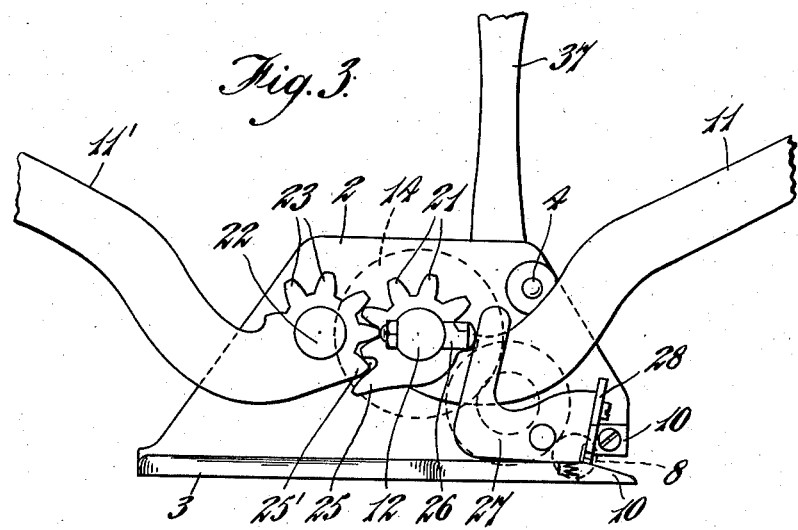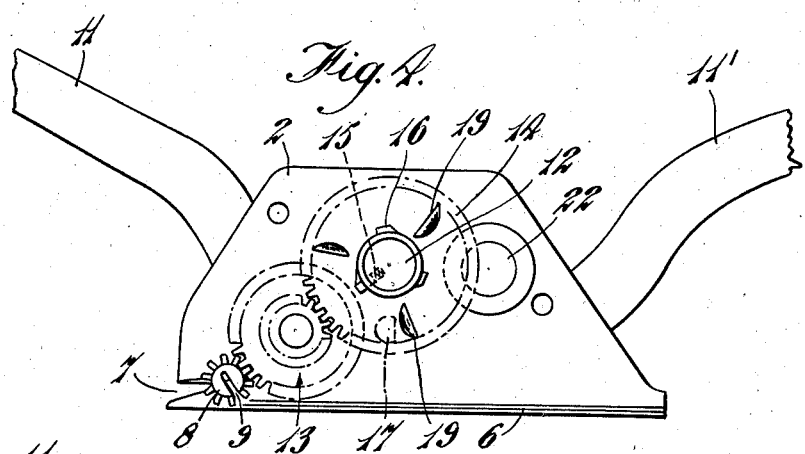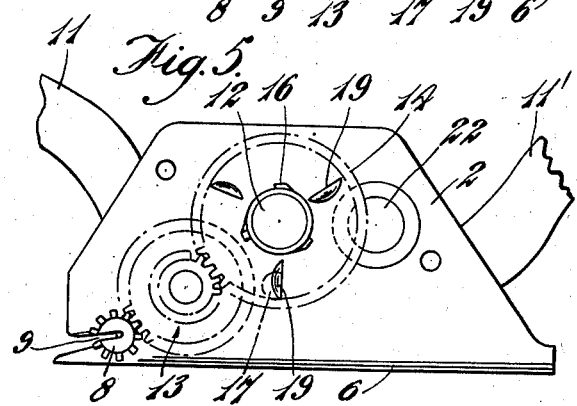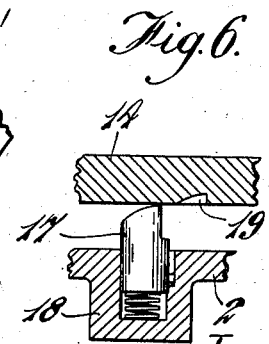

July 12, 1938.  A. R. WALLIS ET AL  2,123,263
WIRE TYING APPARATUS FOR BALING, PACKING, AND THE LIKE
Filed Sept. 24, 1936  3 Sheets-Sheet 3
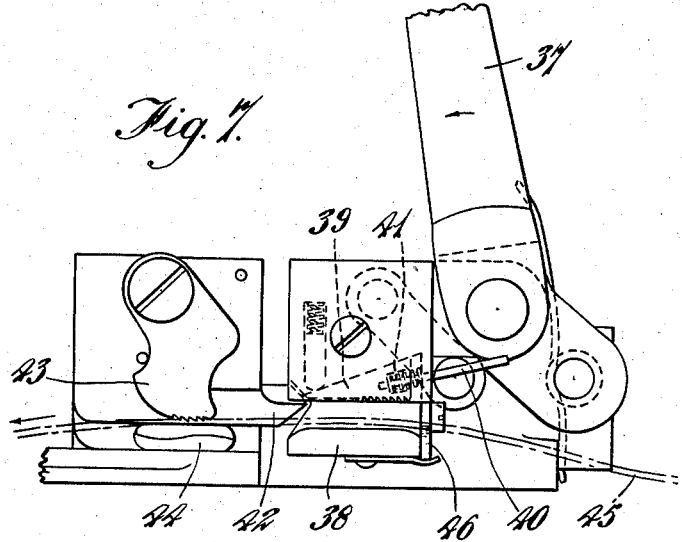
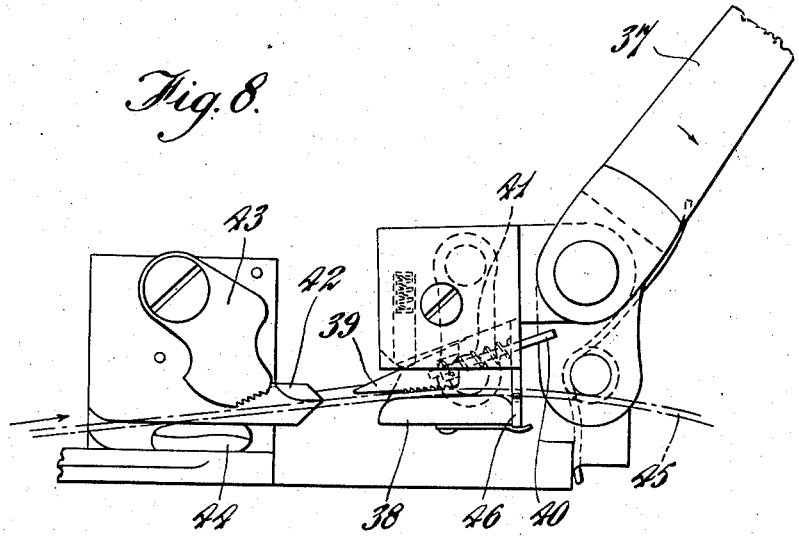
Inventors
Arthur Richard Wallis
John James Creasman
by Arthur W. Thelow Atty.

Patented July 12, 1938

2,123,263

UNITED STATES PATENT OFFICE 2,123,263

WIRE-TYING APPARATUS FOR BALING, PACKING, AND THE LIKE

Arthur Richard Wallis, Hadleigh, and John James Cheesman, Sidcup, England, assignors to Gerrard Industries Limited, Brentford, England Application September 24, 1936, Serial No. 102,270 In Great Britain March 25, 1936

21 Claims. (Cl. 140—93)

Our invention relates to improvements in wire-tying apparatus such as is employed for binding packages.

A principal object of the invention is to provide an improved machine for twisting the wires together.

A further object of the invention is to provide a machine in which the wires are twisted together by the operation of two manual levers which are rocked oppositely, so that the effort of both arms of the operator is effectively utilized, the pull exerted on one lever being balanced by the thrust exerted on the other lever.

A still further object of the invention is to provide a machine in which a uni-directional clutch is included in the transmission to the twisting device whereby after one complete cycle of operations, as for instance a complete reciprocation of the aforementioned manual levers, the machine is ready set for operating on a fresh tie.

A still further object of the invention is to provide a machine in which a uni-directional clutch is designed to transmit movement to a wire-twisting slotted pinion in the operative direction only, the pinion being locked against backward rotation.

A still further object of the invention is the provision in a wire-tying machine of a tensioning device comprising a stationary clamp for holding the tightened wire from slipping back, and a moving clamp which engages the wire for a tensioning stroke but is disengaged therefrom whilst the clamp is brought back for a further tensioning stroke.

By way of example the invention will now be described in greater detail and with reference to still further objects and features thereof as embodied in the improved portable machine for hand operation which is illustrated in the accompanying drawings.

In these drawings:

Figure 3 is a side elevation of the machine without the wire grip and having the handles broken;

Figure 4 is a cross-sectional view through the gear box showing the parts in the positions they assume at the extreme end of the operative movement of the handles;

Figure 5 is a similar cross-sectional view showing the position of the parts at that point of the return movement of the levers when the twisting pinion returns to its normal position and becomes locked against further backward rotation;

Figure 6 is a detail view drawn to a larger scale showing the spring-pressed detent which locks the gearing during the return movement of the levers;

Figure 7 is a full side elevation of the tensioning device with the parts in position for the insertion of the wire, and Figure 8 is a similar view during the tensioning stroke of the handle.

Figure 1:
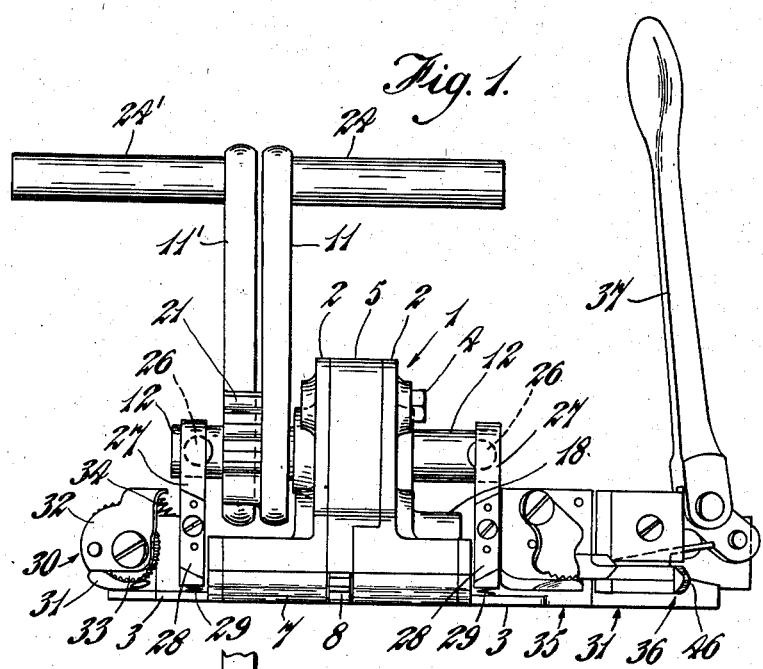
Figure 1 is a front elevation of the complete machine.

The gear box denoted generally by 1 comprises two parallel side walls 2 which upstand from and extend back to front of a flat base. The latter may be divided beneath the gear box, each of the two parts 3 of the base being formed integrally with one of the side walls of the gear box. The body of the machine thus consists of two L-section castings held in spaced relationship by means of bolts 4 passing through the gear box which is provided with a removable top cover plate 5 and a readily removable bottom cover plate which is mounted to slide in the grooves 6 appearing in Fig. 4. Above the front edge of the base extends a groove 7 for engaging the two lengths of wire to be twisted. The wires are inserted laterally into this groove at the centre of which the twisting pinion 8 is located. The slot 9 in the pinion extends radially between two adjacent teeth and includes the axis. The projecting ends are carried in bearings which are cut across by the aforementioned groove in such a way that when the pinion is in its normal position its slot is substantially continuous with the groove. It follows that when the two wires are introduced side by side into the groove they will also become positioned in substantial alignment with the axis of the pinion and on either side thereof. The width of the central part of the slot in the pinion is not sufficient to permit of those portions of the wires engaged therein becoming displaced with respect to one another but the ends of the slot are splayed outwardly to permit a progressive amount of relative twisting movement, whilst the width of the groove itself is sufficient to allow free movement of the wires around one another except at the outer ends where jaws 10 are provided only of sufficient width to accommodate the wires side by side in the relative positions in which they were first introduced into the groove. In this manner the wires are held against displacement at either end of the twisted portion whilst the pinion turns the central part so that the intervening lengths are twisted together.

The manual levers 11 and 11' operate directly on a rock shaft 12 with which the gearing to the pinion 8 is locked during the rotation of the shaft by the levers in the operative direction, the gearing 13 being chosen so that the pinion is turned through a whole number of complete revolutions by this movement. The pinion is preferably rotated a fraction more than the whole number of revolutions so that it is carried a little beyond its normal position as shown in Fig. 4 to allow for the inherent springiness of the wire. Since the pinion is given a whole number of turns it will return to its normal position at the conclusion of the twisting operation and so permit withdrawal of the wire. The small amount of overdrive of the pinion would prevent such withdrawal unless the pinion were free to rotate backwardly to its normal position. During the return movement of the levers to their initial position the gearing is unclutched from the rock shaft and locked against backward rotation except for a small amount of play at the commencement of the movement sufficient to permit the pinion to regain its normal position before becoming locked. The angle through which the rock shaft turns may be some convenient simple fraction of a complete rotation, as for instance one-third of a rotation which permits the use of a number of teeth or notches on the ratchet devices of the clutch equal to the denominator of the fraction chosen. In this manner a clutch key for connecting the rock shaft to the gearing during the operative movement may engage with one of the notches of an associated clutch gear at the end of the previous return movement of the shaft to its initial position, whilst a detent for holding the gearing stationary during the return movement may engage with one of the notches of an associated ratchet-wheel at the end of the operative movement. These ratchet devices may both conveniently be embodied in a single clutch wheel 14 which is in mesh with the gear train 13 to the pinion 8 and is mounted on the rock shaft 12. The clutch key 15 of the first device may be carried in the bearing surface of the shaft engaging with notches 16 provided in the hub face of the clutch wheel, whilst the detent 17 of the second device may be carried by a fixed part of the machine as for instance in a housing 18 on the adjacent wall 2 of the gear box to engage with notches 19 formed on a side face of the gear wheel.

The slight overdrive of the twisting pinion is allowed for by permitting the rock shaft slightly more movement in the operative direction than the simple fraction of a complete rotation. Thus at the end of the operative stroke the notch 19 will have passed over the detent 17 and the latter does not therefore come into action to lock the gearing immediately on the commencement of the reverse rotational movement of the shaft. With the parts in the position shown in Fig. 4 it will be clear that the pinion is free to return back to its initial position shown in Fig. 5 to permit withdrawal of the wires. At this point the detent will come into engagement with the notch to prevent further rotation. Alternatively it is possible to rotate the pinion through this disance, i. e. from the position of Fig. 4 to that of Fig. 5 by means of the handles owing to the conformation of the notches 16 which are capable of holding the head of the clutch key in reverse rotation until sufficient resistance is encountered to cause this head to start riding up the slope of the notch. This of course occurs immediately detent 17 engages notch 19. The detent 17 and notches 19 are made slightly convex and concave respectively which causes them to engage with acceleration. This has the effect of returning the pinion to its normal position in a similar manner to that produced by a ball catch.

The rock shaft 12 is mounted in bearings 20 provided in the side walls 2 of the gear box and projects outside the box on either side thereof. On one of the projecting ends of the shaft is keyed one of the manual levers 11, around part of the hub portion of which gear teeth 21 are cut. On a projecting stub shaft 22 parallel with the main rock shaft is mounted the second manual lever 11' which is also provided with similar teeth 23 around part of its hub in mesh with those on the first lever. There is no step down in this geared connection which is provided solely in order that both levers may be coupled to operate the rock shaft simultaneously whilst being moved in contrary directions. The levers are mounted on their geared hubs in such a way that they can pass one another, the handles 24 and 24' at their outer ends being preferably outwardly directed from one another. Mutually engaging stops 25 and 25' are provided at the ends of the geared portions of the hubs to limit the movement of the levers and consequently of the rock shaft in the manner already set forth.

It will be clear that if desired the rock shaft can be reciprocated as above described by means of a single manual lever only, the additional lever 11' being in these circumstances omitted, suitable stops being provided for limiting the permissible movement of lever 11.

The end of the rock shaft extending beyond the lever mounting and also the other end of the shaft extending from the opposite side of the gear box are both provided with radially projecting dogs 26 the length of which is adjustable. These dogs each operate cutting tools which are arranged immediately adjacent the jaws at the ends of the groove already described in which the wires are held for twisting. Each of these tools is mounted on a bell crank 27 which is operated by the associated dog on the rock shaft when the latter is nearing the end of its operative rotation. The adjustment provided for the dog enables the stroke of the cutter to be altered as desired to allow for grinding. Each tool 28 may conveniently be provided with a cutting edge at either end so that a new edge is brought into play by merely reversing the tool. The crank is spring-urged by a coil spring 29 so that the cutter is normally raised and is depressed by the action of the dog. Since the wires are held side by side it is of course necessary to arrange for the tools to sever only the free portion of wire, the rearmost wire at one end of the groove and the foremost wire at the other end, leaving intact the loop passing around the package.

Figure 2:
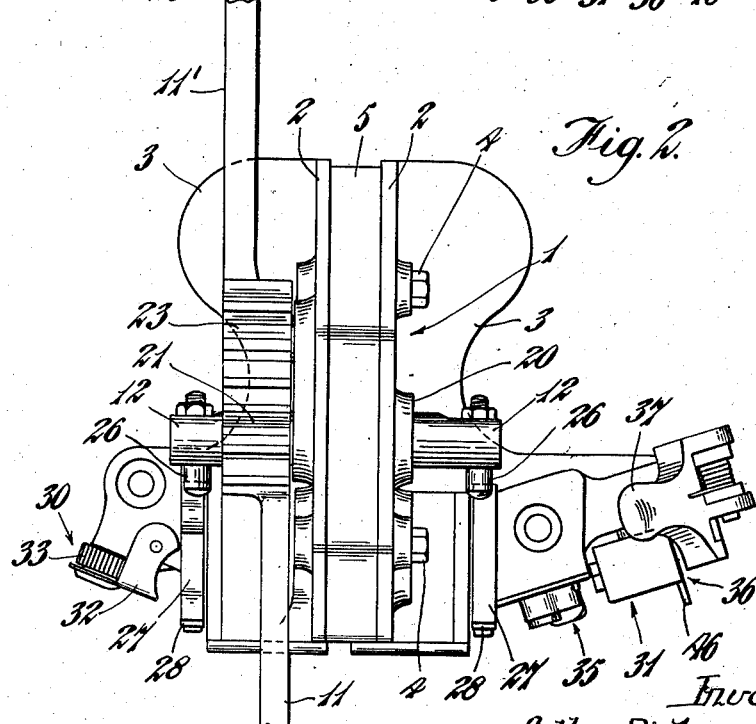
Figure 2 is a plan view thereof.

On either side of the twisting device and beyond the cutters are arranged respectively the grip 30 for one end of the wire and the tensioning device 31 for engaging the other end of the wire. This latter may be continuous with the supply coil of wire, the tie being cut to exact length from the latter by the operation of the machine itself, or alternatively previously cut wires of sufficient length to be engaged by the tensioning device may be employed. Both the grip and the tensioning device are set back at an angle from the groove of the twisting device as best shown in Fig. 2 so that the wires are drawn into proper engagement within the groove.

The grip comprises a stationary lower jaw 31 with a back stop to prevent the end of the wire from being inserted to an unnecessary extent. The gripping surface of the top jaw 32 is serrated, the teeth being directed backwardly to resist withdrawal of the wire from the grip. These serrations may, if desired, be formed on the periphery of a wheel 33 which is fixed on the jaw stock but which may be turned from time to time as the serrations become worn. This jaw or jaw stock is mounted pivotally in such a way that a pull on the wire by reason of the engagement of the serrations in the latter tends to bring the jaws into closer engagement. The top jaw is also spring-urged towards the closed position by means of coil spring 34.

The tensioning device essentially comprises a stationary clamp 35 for holding the tightened wire from slipping back and a moving clamp 36 which is operated from a suitable handle 37 and engages the wire for the tensioning stroke of the handle and releases it whilst the handle is brought back for a further tensioning stroke. Once the wire is under tension its tendency to close the stationary clamp more firmly is sufficient to make it difficult or impossible to release the latter by pulling back the handle.

In the tensioning device as illustrated the stationary clamp is located between the moving clamp and the twisting device. The handle is in this case rocked in line with the wire, being mounted on the base of the machine and pivotally coupled to the moving clamp. The body of the latter comprises a fixed lower jaw 38 (see Figs. 7 and 8) and is provided with a sliding upper jaw 39 which is spring-urged into engagement with the fixed jaw at an inclined angle. The sliding jaw is guided by means of pin 40 around which is the spring 41. This sliding jaw is backwardly serrated to engage the wire and is operated as a result of the movement of the body of the clamp by the handle. When the latter is pulled back in the direction of the arrow in Fig. 7 a projecting end of the jaw contacts with a fixed stop 42 and further movement of the handle causes the jaw to slide upwardly and rearwardly whereby the clamp is opened. During the tensioning stroke of the handle the sliding jaw leaves the stop and engages the wire. The stationary clamp is similar to the grip already described. However, the pivoted jaw 43 need not in this case be spring-urged into engagement with the fixed lower jaw 44. The pivoted jaw is adapted to be swung open manually. This combination of clamps permits the ready insertion of the wire 45 to be tensioned from the front after the handle has been pulled hard back to the position shown in Fig. 7 to open the moving clamp in the manner described. A slotted spring-urged keeper 46 may be provided to hold the wire in place until it becomes gripped. Outward movement of the handle in the direction of the arrow in Fig. 8 to tension the wire first results in the jaws of the moving clamp coming into contact with the wire and gripping it firmly whilst it is free to pass the stationary clamp. However, directly the tension imposed by the moving clamp is released the stationary clamp automatically comes into operation to prevent the wire from slipping back, and the moving clamp becomes disengaged from the wire during the return stroke of the handle.

It is to be understood that the above-described embodiment of the invention is for the purpose of illustration only and various changes may be made therein without departing from the spirit and scope of the invention, reference being had to the appended claims for a definition of the limits of the invention.

We claim as our invention:—

1. An improved wire-tying machine comprising a slotted pinion for engaging and twisting together the wires, a rock shaft in geared operative connection with said pinion and two oppositely moving operating levers for actuating said rock shaft.

2. A wire-tying machine comprising means for twisting the wires together, a rock shaft operatively connected to said twisting means and two oppositely moving operating levers, one of which is mounted on the rock-shaft and is operatively coupled to the other lever which is pivotally mounted on an adjacent stub shaft.

3. A machine according to claim 2, in which the operative coupling is effected by intermeshing gear teeth provided around the hub portions of the levers.

4. A wire-tying machine comprising two oppositely moving operating levers, a slotted pinion for engaging and twisting together the wires, and a transmission between the levers and the pinion whereby a complete reciprocation of the levers rotates the pinion through a whole number of complete revolutions.

5. A wire-tying machine comprising operating means, wire twisting means and a transmission including a one way clutch mechanism between the said operating means and the said twisting means whereby the said twisting means is locked against reverse movement.

6. A wire-tying machine comprising a slotted pinion for engaging and twisting together the wires, and a manually operated transmission operatively connected to the said pinion and including a one way clutch mechanism whereby the pinion is rotated in one direction only, and is locked against backward rotation.

7. A machine according to claim 6, wherein the transmission permits of the pinion being forwardly rotated a fraction more than a whole number of complete revolutions whilst leaving it free to rotate backwardly through this fraction of a revolution to its normal position before becoming locked.

8. A wire-tying machine comprising a rock shaft, operating means therefor, means for twisting the wires together and a transmission between the said rock shaft and the said twisting means, the said transmission including two ratchet devices one of which becomes effective at the end of the previous return movement of the said shaft to its initial position whilst the second ratchet becomes effective at the end of the operative movement of the said shaft.

9. A wire-tying machine comprising a rock-shaft, operating means therefor, means for twisting the wires together and a transmission between the said rock-shaft and the said twisting means, the said transmission including a clutch mechanism consisting of a single clutch wheel which is mounted on the rock-shaft, one ratchet device being provided to key the wheel to the shaft in the operative direction of rotation of the latter, and a second ratchet device being provided to prevent rotation of the wheel in the opposite direction.

10. A machine according to claim 9, wherein a clutch key is provided in the bearing surface of the rock-shaft engaging with notches provided in the hub face of the clutch wheel, and a detent carried by a fixed part of the machine is provided to engage notches on the side face of the clutch wheel.

11. A wire-tying machine comprising two oppositely moving operating levers, a rock-shaft in operative connection with the said levers, a slotted pinion for engaging and twisting together the wires and a transmission between the said rock shaft and the said pinion including a clutch mechanism whereby the pinion is coupled to the shaft in the direction of operative movement of the latter, but becomes locked against return movement on the completion of a twisting operation.

12. A wire-tying machine comprising wire twisting means, a grip for one end of the wire, and a tensioning device consisting of a stationary clamp for holding the tightened wire from slipping back, and a moving clamp which engages the wire for a tensioning stroke but is disengaged therefrom whilst the clamp is brought back for a further tensioning stroke.

13. A machine according to claim 12, wherein the stationary clamp is located between the twisting means and the moving clamp.

14. A machine according to claim 12, wherein the moving clamp is actuated by a pivoted handle which is rocked in line with the wire.

15. A machine according to claim 12 wherein the moving clamp comprises a fixed lower jaw and a sliding upper jaw which is resiliently urged towards the fixed jaw at an inclined angle.

16. A wire-tying machine as claimed in claim 12 in which said movable clamp comprises a lower jaw, an upper jaw slidable relatively to said lower jaw in a direction inclined to the gripping surface thereof, and means for urging said upper jaw to slide toward said lower jaw and in which a fixed stop is provided to contact said upper jaw and cause it to slide away from said lower jaw when said movable clamp is moved fully back.

17. A wire-tying machine comprising a slotted pinion, a rock shaft in driving connection with said slotted pinion, an operating lever on said rock shaft, a stub shaft, a second operating lever on said stub shaft, teeth associated with each of said levers and meshing together to couple said levers for rocking movement in opposite directions to operate in common on said rock shaft, and teeth associated with each of said levers capable of cooperating to limit the rocking movement of said levers.

18. A wire-tying machine comprising a slotted pinion, a rock shaft, an operating lever fixed upon said rock shaft, a second operating lever geared to said first lever for simultaneous rocking movement in the opposite sense, clutch means whereby rocking movement of said first lever in one sense causes said slotted pinion to rotate, and clutch means whereby reverse rotation of said slotted pinion is prevented.

19. A clamping device for use in tensioning wire in a wire-tying machine comprising a pair of upper and lower movable jaws, said upper jaw being slidable relatively to said lower jaw and urged toward contact therewith in a direction inclined to the gripping surface of said lower jaw.

20. A clamping device as claimed in claim 19 wherein said upper jaw is carried by a member which moves with said lower jaw, said member having a surface which is inclined to the gripping surface of said lower jaw and guides said upper jaw for sliding movement in a direction inclined to said gripping surface.

21. A clamping device as claimed in claim 19 comprising a member carrying said upper and lower jaws, a pivoted link whereby said carrying member is mounted for arcuate motion and an operating lever whereby said carrying member may be caused to move about one of the pivotal axes of said link.

ARTHUR RICHARD WALLIS.
JOHN JAMES CHEESMAN.